US012772134B2

(12) United States Patent
Lim et al.

(10) Patent No.: US 12,772,134 B2
(45) Date of Patent: Oct. 20, 2026

(54) METHOD AND APPARATUS FOR HANDOVER OF URBAN AIR MOBILITY IN COMMUNICATION SYSTEM

(71) Applicant: ELECTRONICS AND TELECOMMUNICATIONS RESEARCH INSTITUTE, Daejeon (KR)

(72) Inventors: Soon Yong Lim, Daejeon (KR); Sook Yang Kang, Daejeon (KR); Sung Min Oh, Daejeon (KR); You Sun Hwang, Daejeon (KR)

(73) Assignee: ELECTONICS AND TELECOMMNICATIONS RESEARCH INSTITUTE, Daejeon (KR)

( * ) Notice: Subject to any disclaimer, the term of this patent is extended or adjusted under 35 U.S.C. 154(b) by 341 days.

(21) Appl. No.: 18/501,472

(22) Filed: Nov. 3, 2023

(65) Prior Publication Data

US 2024/0155455 A1 May 9, 2024

(30) Foreign Application Priority Data

Nov. 7, 2022 (KR) ........................ 10-2022-0147076
Oct. 23, 2023 (KR) ........................ 10-2023-0142165

(51) Int. Cl.
*H04W 36/30* (2009.01)
*H04W 36/00* (2009.01)
*H04W 36/32* (2009.01)

(52) U.S. Cl.
CPC ....... *H04W 36/30* (2013.01); *H04W 36/0079* (2018.08); *H04W 36/0085* (2018.08); *H04W 36/32* (2013.01)

(58) Field of Classification Search
CPC ............ H04W 36/30; H04W 36/0079; H04W 36/0085; H04W 36/32; H04W 84/06; H04W 36/322
See application file for complete search history.

(56) References Cited

U.S. PATENT DOCUMENTS 11,129,067 B2 * 9/2021 Kim .................... H04W 36/302
11,396,304 B2 7/2022 Kim
(Continued)

FOREIGN PATENT DOCUMENTS

KR 10-2019-0104013 A 9/2019

OTHER PUBLICATIONS

3GPP, "3rd Generation Partnership Project; Technical Specification Group Services and System Aspects; Uncrewed Aerial System (UAS) support in 3GPP; Stage 1; Release 17", 3GPP TS 22.125 V17.6.0 (Mar. 2022).

*Primary Examiner* — Will W Lin
(74) *Attorney, Agent, or Firm* — LRK PATENT LAW FIRM

(57) ABSTRACT

A method of an aerial vehicle for urban air mobility may include: reporting, to a first base station, a measurement result for neighboring base stations including a second base station; receiving, from the first base station and as a processing result based on the measurement result, an indication of a failure of a handover to the second base station; requesting, to a control station, first location information indicating a first location to move according to the failure of the handover; receiving the first location information from the control station; and moving according to the received first location information.

18 Claims, 10 Drawing Sheets

(56) References Cited

U.S. PATENT DOCUMENTS

| | | | | |
|---|---|---|---|---|
| 2014/0179325 | A1* | 6/2014 | Xu | H04W 76/19 455/437 |
| 2019/0306768 | A1* | 10/2019 | Kim | H04W 36/302 |
| 2020/0023969 | A1* | 1/2020 | Moon | B64U 50/34 |
| 2020/0236602 | A1* | 7/2020 | Mahkonen | H04W 76/25 |
| 2020/0252838 | A1 | 8/2020 | Akdeniz et al. | |
| 2021/0287559 | A1* | 9/2021 | Jeong | G06V 10/25 |
| 2022/0124576 | A1 | 4/2022 | Kimura | |
| 2022/0225154 | A1 | 7/2022 | Chen et al. | |
| 2022/0264653 | A1 | 8/2022 | Xiong et al. | |
| 2022/0322222 | A1 | 10/2022 | Shin et al. | |
| 2022/0377545 | A1 | 11/2022 | Wang et al. | |
| 2022/0407588 | A1 | 12/2022 | Kim | |
| 2022/0408331 | A1 | 12/2022 | Park et al. | |
| 2023/0239724 | A1* | 7/2023 | Pateromichelakis | H04W 4/46 370/230 |
| 2023/0284030 | A1* | 9/2023 | Baskaran | H04W 12/71 455/411 |
| 2023/0284078 | A1* | 9/2023 | Pateromichelakis | H04W 28/24 370/235 |
| 2024/0224150 | A1* | 7/2024 | Chang | H04W 36/0079 |
| 2025/0063456 | A1* | 2/2025 | Kim | H04W 24/10 |

* cited by examiner

METHOD AND APPARATUS FOR HANDOVER OF URBAN AIR MOBILITY IN COMMUNICATION SYSTEM

CROSS-REFERENCE TO RELATED APPLICATIONS

This application claims priority to Korean Patent Applications No. 10-2022-0147076, filed on Nov. 7, 2022, and No. 10-2023-0142165, filed on Oct. 23, 2023, with the Korean Intellectual Property Office (KIPO), the entire contents of which are hereby incorporated by reference.

BACKGROUND

1. Technical Field

Exemplary embodiments of the present disclosure relate to a handover technique for urban air mobility (UAM) in a communication system, and more specifically, to a handover technique for UAM in a communication system, in which an aerial vehicle maintains communication with an air traffic control station to prevent communication interruption even in case of a handover failure.

2. Description of Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

Meanwhile, such the communication network may provide communication services to terminals located in terrestrial sites, and may be a terrestrial network. Recently, the demand for communication services for airplanes, drones, satellites, etc. located not only in the terrestrial sites but also in non-terrestrial spaces is increasing. Accordingly, techniques for a non-terrestrial network (NTN) are being under discussion. In the non-terrestrial network, urban air mobility (UAM) can serve as an aerial mobility platform that can radically improve urban transportation and urban environmental issues. In the UAM, an aerial vehicle may move cell to cell. In this scenario, the aerial vehicle for UAM may perform a handover. If a handover failure occurs in such the situation, communication between a UAM control station and the aerial vehicle may be interrupted, leading to operational disruptions for the aerial vehicle.

SUMMARY

Exemplary embodiments of the present disclosure are directed to providing a method and an apparatus for handover of UAM in a communication system, in which an aerial vehicle maintains communication with an air traffic control station to prevent communication interruption even in case of a handover failure.

According to a first exemplary embodiment of the present disclosure, a method of an aerial vehicle for urban air mobility may comprise: reporting, to a first base station, a measurement result for neighboring base stations including a second base station; receiving, from the first base station and as a processing result based on the measurement result, an indication of a failure of a handover to the second base station; requesting, to a control station, first location information indicating a first location to move according to the failure of the handover; receiving the first location information from the control station; and moving according to the received first location information.

The reporting of the measurement result for neighboring base stations may comprise: receiving, from the first base station, measurement configuration for the neighboring base stations including the second base station; performing measurements on signal strengths of the neighboring base stations; and reporting the measurement result of performing the measurements to the first base station.

The method may further comprise: establishing C2 communication with the control station; transmitting first data to the control station through the C2 communication; and receiving second data from the control station through the C2 communication.

The C2 communication may be performed using one of a direct C2 communication scheme, a network-assisted C2 communication scheme, or an uncrewed aerial system traffic management (UTM)-navigated C2 communication scheme.

The first base station and the second base station may constitute a UAM corridor, and the aerial vehicle may move through an airspace along the UAM corridor.

The airspace may be composed of a taxiing layer at a first altitude section and a parking layer at a second altitude section including a space hole, an altitude of the first altitude section is higher than an altitude of the second altitude section, and the first location is a location included in the parking layer.

The method may further comprise: receiving, from the first base station, a handover command in response to that a cause of the failure of the handover in the second base station is resolved; performing a handover to the second base station according to the handover command; and transmitting a message indicating radio resource control (RRC) configuration completion to the second base station.

The method may further comprise: requesting, to the control station, second location information indicating a second location to resume movement according to the handover command; receiving, from the control station, the second location information indicating the second location to resume movement; and moving according to the received second location information.

According to a second exemplary embodiment of the present disclosure, a method of a first base station for urban air mobility may comprise: receiving, from an aerial vehicle, a measurement result for neighboring base stations including a second base station; determining a handover to the second base station based on the measurement result; transmitting a handover request to the second base station; receiving an indication of a failure of the handover from the second base station; and transmitting an indication of the failure of the handover to the aerial vehicle, wherein the first base station and the second base station constitute a UAM corridor, and the aerial vehicle moves through an airspace along the UAM corridor.

The receiving of the measurement result for neighboring base stations may comprise: transmitting, to the aerial vehicle, measurement configuration for the neighboring base stations including the second base station; and receiving, from the second base station, the measurement result of performing measurements on the neighboring base stations.

The handover request may include context of the aerial vehicle and an indication of storing the context of the aerial vehicle.

The airspace may be composed of a taxiing layer at a first altitude section and a parking layer at a second altitude section including a space hole, an altitude of the first altitude section is higher than an altitude of the second altitude section, and the first location is a location included in the parking layer.

The method may further comprise: receiving, from the second base station, a handover command in response to that a cause of the failure of the handover in the second base station is resolved; and transmitting the handover command to the aerial vehicle. According to a third exemplary embodiment of the present disclosure, an aerial vehicle for urban air mobility may comprise a processor, and the processor may cause the aerial vehicle to perform: reporting, to a first base station, a measurement result for neighboring base stations including a second base station; receiving, from the first base station and as a processing result based on the measurement result, an indication of a failure of a handover to the second base station; requesting, to a control station, first location information indicating a first location to move according to the failure of the handover; receiving the first location information from the control station; and moving according to the received first location information.

In the reporting of the measurement result for neighboring base stations, the processor may further cause the aerial vehicle to perform: receiving, from the first base station, measurement configuration for the neighboring base stations including the second base station; performing measurements on signal strengths of the neighboring base stations; and reporting the measurement result of performing the measurements to the first base station.

The processor may further cause the aerial vehicle to perform: establishing C2 communication with the control station; transmitting first data to the control station through the C2 communication; and receiving second data from the control station through the C2 communication.

The processor may further cause the aerial vehicle to perform: receiving, from the first base station, a handover command in response to that a cause of the failure of the handover in the second base station is resolved; performing a handover to the second base station according to the handover command; and transmitting a message indicating radio resource control (RRC) configuration completion to the second base station.

The processor may further cause the aerial vehicle to perform: requesting, to the control station, second location information indicating a second location to resume movement according to the handover command; receiving, from the control station, the second location information indicating the second location to resume movement; and moving according to the received second location information.

According to the present disclosure, when an aerial vehicle moves using a corridor and a handover fails, it may connect to an air traffic control station and request coordinates of a location in a parking layer where it can move and stay for a while. Accordingly, according to the present disclosure, the aerial vehicle may receive the coordinates of the location in the parking layer from the air traffic control station, move to the parking layer, and stay there for a while. In this case, according to the present disclosure, the aerial vehicle can maintain a communication state with the control station and prevent communication interruption.

DETAILED DESCRIPTION OF THE EMBODIMENTS

Figure 1:
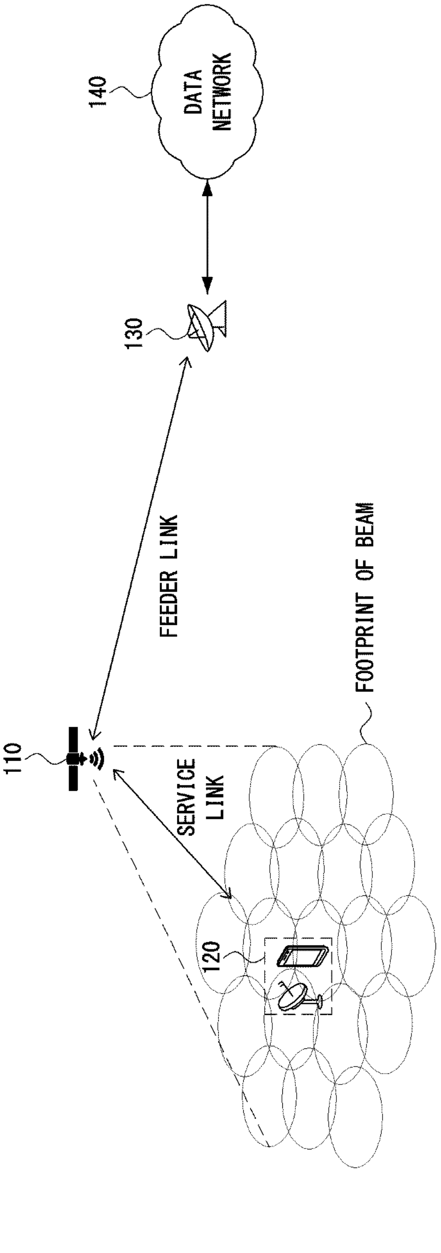
FIG. 1 is a conceptual diagram illustrating a first exemplary embodiment of a non-terrestrial network.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B".

In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication network to which exemplary embodiments according to the present disclosure are applied will be described. The communication system may be a non-terrestrial network (NTN), a 4G communication network (e.g., long-term evolution (LTE) communication network), a 5G communication network (e.g., new radio (NR) communication network), a 6G communication network, or the like. The 4G communication network, 5G communication network, and 5G communication network may be classified as terrestrial networks.

The NTN may operate based on the LTE technology and/or the NR technology. The NTN may support communications in frequency bands below 6 GHz as well as in frequency bands above 6 GHz. The 4G communication network may support communications in the frequency band below 6 GHz. The 5G communication network may support communications in the frequency band below 6 GHz as well as in the frequency band above 6 GHz. The communication network to which the exemplary embodiments according to the present disclosure are applied is not limited to the contents described below, and the exemplary embodiments according to the present disclosure may be applied to various communication networks. Here, the communication network may be used in the same sense as the communication system.

FIG. 1 is a conceptual diagram illustrating a first exemplary embodiment of a non-terrestrial network.

Referring to FIG. 1, a non-terrestrial network (NTN) may include a satellite 110, a communication node 120, a gateway 130, a data network 140, and the like. The NTN shown in FIG. 1 may be an NTN based on a transparent payload. The satellite 110 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform. The UAS platform may include a high altitude platform station (HAPS).

The communication node 120 may include a communication node (e.g., a user equipment (UE) or a terminal) located on a terrestrial site and a communication node (e.g., an airplane, a drone) located on a non-terrestrial space. A service link may be established between the satellite 110 and the communication node 120, and the service link may be a radio link. The satellite 110 may provide communication services to the communication node 120 using one or more beams. The shape of a footprint of the beam of the satellite 110 may be elliptical.

The communication node 120 may perform communications (e.g., downlink communication and uplink communication) with the satellite 110 using LTE technology and/or NR technology. The communications between the satellite 110 and the communication node 120 may be performed using an NR-Uu interface. When dual connectivity (DC) is supported, the communication node 120 may be connected to other base stations (e.g., base stations supporting LTE and/or NR functionality) as well as the satellite 110, and perform DC operations based on the techniques defined in the LTE and/or NR specifications.

The gateway 130 may be located on a terrestrial site, and a feeder link may be established between the satellite 110 and the gateway 130. The feeder link may be a radio link. The gateway 130 may be referred to as a 'non-terrestrial network (NTN) gateway'. The communications between the satellite 110 and the gateway 130 may be performed based on an NR-Uu interface or a satellite radio interface (SRI). The gateway 130 may be connected to the data network 140. There may be a 'core network' between the gateway 130 and the data network 140. In this case, the gateway 130 may be connected to the core network, and the core network may be connected to the data network 140. The core network may support the NR technology. For example, the core network may include an access and mobility management function (AMF), a user plane function (UPF), a session management function (SMF), and the like. The communications between the gateway 130 and the core network may be performed based on an NG-C/U interface.

Alternatively, a base station and the core network may exist between the gateway 130 and the data network 140. In this case, the gateway 130 may be connected with the base station, the base station may be connected with the core network, and the core network may be connected with the data network 140. The base station and core network may support the NR technology. The communications between the gateway 130 and the base station may be performed based on an NR-Uu interface, and the communications between the base station and the core network (e.g., AMF, UPF, SMF, and the like) may be performed based on an NG-C/U interface.

Figure 2:
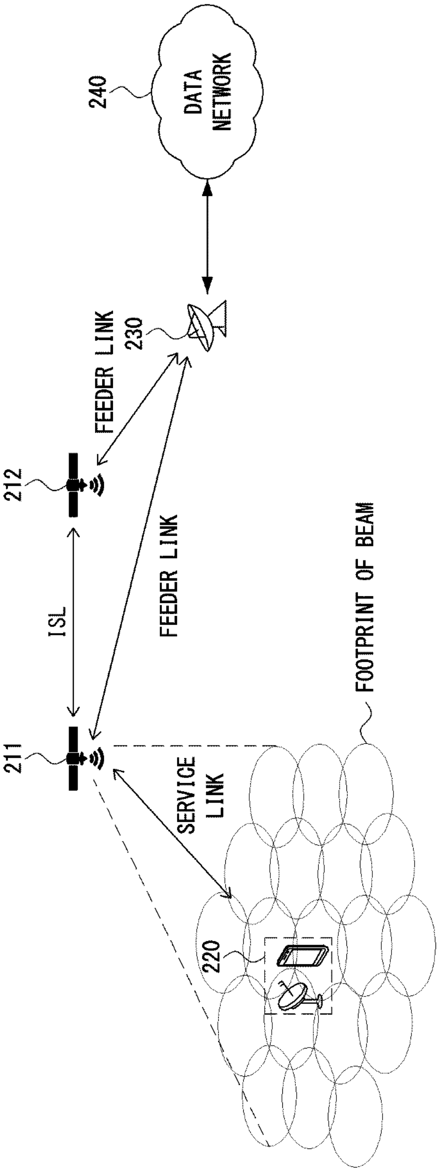
FIG. 2 is a conceptual diagram illustrating a second exemplary embodiment of a non-terrestrial network.

FIG. 2 is a conceptual diagram illustrating a second exemplary embodiment of a non-terrestrial network.

Referring to FIG. 2, a non-terrestrial network may include a first satellite 211, a second satellite 212, a communication node 220, a gateway 230, a data network 240, and the like. The NTN shown in FIG. 2 may be a regenerative payload based NTN. For example, each of the satellites 211 and 212 may perform a regenerative operation (e.g., demodulation, decoding, re-encoding, re-modulation, and/or filtering operation) on a payload received from other entities (e.g., the communication node 220 or the gateway 230), and transmit the regenerated payload.

Each of the satellites 211 and 212 may be a LEO satellite, a MEO satellite, a GEO satellite, a HEO satellite, or a UAS platform. The UAS platform may include a HAPS. The satellite 211 may be connected to the satellite 212, and an inter-satellite link (ISL) may be established between the satellite 211 and the satellite 212. The ISL may operate in an RF frequency band or an optical band. The ISL may be established optionally. The communication node 220 may include a terrestrial communication node (e.g., UE or terminal) and a non-terrestrial communication node (e.g., airplane or drone). A service link (e.g., radio link) may be established between the satellite 211 and communication node 220. The satellite 211 may provide communication services to the communication node 220 using one or more beams.

The communication node 220 may perform communications (e.g., downlink communication or uplink communication) with the satellite 211 using LTE technology and/or NR technology. The communications between the satellite 211 and the communication node 220 may be performed using an NR-Uu interface. When DC is supported, the communication node 220 may be connected to other base stations (e.g., base stations supporting LTE and/or NR functionality) as well as the satellite 211, and may perform DC operations based on the techniques defined in the LTE and/or NR specifications.

The gateway 230 may be located on a terrestrial site, a feeder link may be established between the satellite 211 and the gateway 230, and a feeder link may be established between the satellite 212 and the gateway 230. The feeder link may be a radio link. When the ISL is not established between the satellite 211 and the satellite 212, the feeder link between the satellite 211 and the gateway 230 may be established mandatorily.

The communications between each of the satellites 211 and 212 and the gateway 230 may be performed based on an NR-Uu interface or an SRI. The gateway 230 may be connected to the data network 240. There may be a core network between the gateway 230 and the data network 240. In this case, the gateway 230 may be connected to the core network, and the core network may be connected to the data network 240. The core network may support the NR technology. For example, the core network may include AMF, UPF, SMF, and the like. The communications between the gateway 230 and the core network may be performed based on an NG-C/U interface.

Alternatively, a base station and the core network may exist between the gateway 230 and the data network 240. In this case, the gateway 230 may be connected with the base station, the base station may be connected with the core network, and the core network may be connected with the data network 240. The base station and the core network may support the NR technology. The communications between the gateway 230 and the base station may be performed based on an NR-Uu interface, and the communications between the base station and the core network (e.g., AMF, UPF, SMF, and the like) may be performed based on an NG-C/U interface.

Meanwhile, entities (e.g., satellites, communication nodes, gateways, etc.) constituting the NTNs shown in FIGS. 1 and 2 may be configured as follows.

Figure 3:
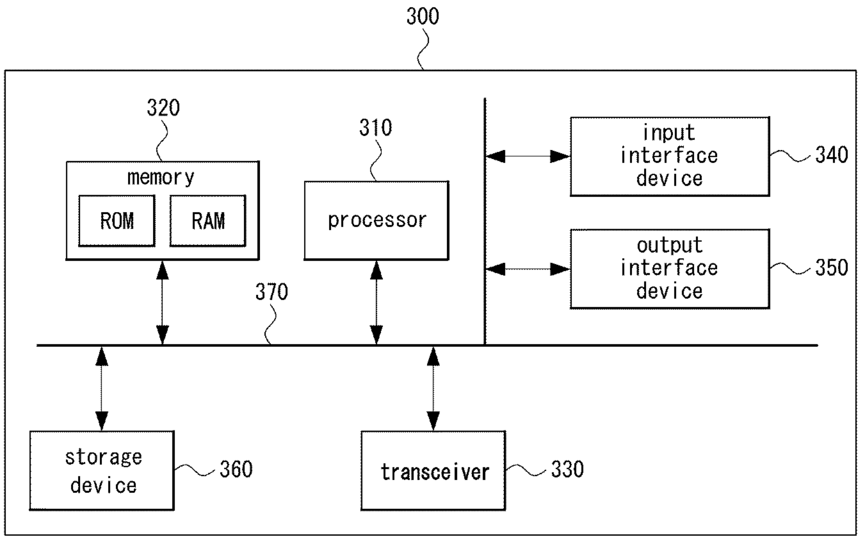
FIG. 3 is a block diagram illustrating a first exemplary embodiment of an entity constituting a non-terrestrial network.

FIG. 3 is a block diagram illustrating a first exemplary embodiment of an entity constituting a non-terrestrial network.

Referring to FIG. 3, an entity 300 may include at least one processor 310, a memory 320, and a transceiver 330 connected to a network to perform communication. In addition, the entity 300 may further include an input interface device 340, an output interface device 350, a storage device 360, and the like. The components included in the entity 300 may be connected by a bus 370 to communicate with each other.

However, each component included in the entity 300 may be connected to the processor 310 through a separate interface or a separate bus instead of the common bus 370. For example, the processor 310 may be connected to at least one of the memory 320, the transceiver 330, the input interface device 340, the output interface device 350, and the storage device 360 through a dedicated interface.

The processor 310 may execute at least one instruction stored in at least one of the memory 320 and the storage device 360. The processor 310 may refer to a central processing unit (CPU), a graphics processing unit (GPU), or a dedicated processor on which the methods according to the exemplary embodiments of the present disclosure are performed. Each of the memory 320 and the storage device 360 may be configured as at least one of a volatile storage medium and a nonvolatile storage medium. For example, the memory 320 may be configured with at least one of a read only memory (ROM) and a random access memory (RAM).

Meanwhile, scenarios in the NTN may be defined as shown in Table 1 below.

TABLE 1

| | NTN shown in FIG. 1 | NTN shown in FIG. 2 |
|---|---|---|
| GEO | Scenario A | Scenario B |
| LEO (steerable beams) | Scenario C1 | Scenario D1 |
| LEO (beams moving with satellite) | Scenario C2 | Scenario D2 |

When the satellite 110 in the NTN shown in FIG. 1 is a GEO satellite (e.g., a GEO satellite that supports a transparent function), this may be referred to as 'scenario A'. When the satellites 211 and 212 in the NTN shown in FIG. 2 are GEO satellites (e.g., GEOs that support a regenerative function), this may be referred to as 'scenario B'.

When the satellite 110 in the NTN shown in FIG. 1 is an LEO satellite with steerable beams, this may be referred to as 'scenario C1'. When the satellite 110 in the NTN shown in FIG. 1 is an LEO satellite having beams moving with the satellite, this may be referred to as 'scenario C2'. When the satellites 211 and 212 in the NTN shown in FIG. 2 are LEO satellites with steerable beams, this may be referred to as 'scenario D1'. When the satellites 211 and 212 in the NTN shown in FIG. 2 are LEO satellites having beams moving with the satellites, this may be referred to as 'scenario D2'. Parameters for the scenarios defined in Table 1 may be defined as shown in Table 2 below.

TABLE 2

| | Scenarios A and B | Scenarios C and D |
|---|---|---|
| Altitude | 35,786 km | 600 km<br>1,200 km |
| Spectrum (service link) | <6 GHz (e.g., 2 GHz)<br>>6 GHz (e.g., DL 20 GHz, UL 30 GHz) | |
| Maximum channel bandwidth capability (service link) | 30 MHz for band <6 GHz<br>1 GHz for band >6 GHz | |
| Maximum distance between satellite and communication node (e.g., UE) at the minimum elevation angle | 40,581 km | 1,932 km (altitude of 600 km)<br>3,131 km (altitude of 1,200 km) |
| Maximum round trip delay (RTD) (only propagation delay) | Scenario A: 541.46 ms (service and feeder links)<br>Scenario B: 270.73 ms (only service link) | Scenario C: (transparent payload: service and feeder links)<br>–5.77 ms (altitude of 60 0 km)<br>–41.77 ms (altitude of 1,200 km)<br>Scenario D: (regenerative payload: only service link)<br>–12.89 ms (altitude of 600 km)<br>–20.89 ms (altitude of 1,200 km) |
| Maximum delay variation within a single beam | 16 ms | 4.44 ms (altitude of 600 km)<br>6.44 ms (altitude of 1,200 km) |
| Maximum differential delay within a cell | 10.3 ms | 3.12 ms (altitude of 600 km)<br>3.18 ms (altitude of 1,200 km) |
| Service link | NR defined in 3GPP | |
| Feeder link | Radio interfaces defined in 3GPP or non-3GPP | |

In addition, in the scenarios defined in Table 1, delay constraints may be defined as shown in Table 3 below.

TABLE 3

| | Scenario A | Scenario B | Scenario C1-2 | Scenario D1-2 |
|---|---|---|---|---|
| Satellite altitude | 35,786 km | | 600 km | |
| Maximum RTD in a radio interface between base station and UE | 541.75 ms (worst case) | 270.57 ms | 28.41 ms | 12.88 ms |
| Minimum RTD in a radio interface between base station and UE | 477.14 ms | 238.57 ms | 8 ms | 4 ms |

Meanwhile, such the communication network may provide communication services to terminals located in terrestrial sites, and may be a terrestrial network. Recently, the demand for communication services for airplanes, drones, satellites, etc. located not only in the terrestrial sites but also in non-terrestrial spaces is increasing. Accordingly, techniques for the NTN are being under discussion.

In the NTN, urban air mobility (UAM) may be an air mobility platform that can dramatically improve urban traffic and urban environmental issues. The UAM may refer to an urban transportation system that transports people and cargo using aerial vehicles. The UAM may include not only aerial vehicles but also air traffic control, takeoff and landing facilities, and transportation service platforms. Here, the UAM aerial vehicle may include a personal air vehicle (PAV) capable of vertical takeoff and landing (VTOL), an air taxi, and the like.

The UAM aerial vehicles may transport passengers or cargo through one or more UAM corridors. In this case, the UAM aerial vehicles may operate along a designated airspace. Here, the airspace may be a space defined as a specific range at a certain height from the ground or sea level to ensure the safe activities of UAM aerial vehicles such as aircraft, light aircraft, and ultralight vehicles. For UAM operations, construction of a communication system that will provide communication services for UAM controls, UAM operators, and users may be required. In particular, the communication system for UAM operations may require on-board communication technology for UAM aerial vehicles to ensure communication integrity in various situations and locations. For this purpose, the communication system for UAM operations may use 5G, 6G, or LEO satellite communication devices.

Figure 4:
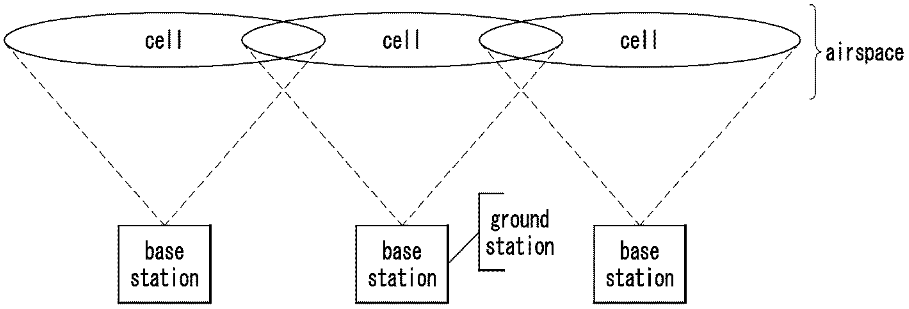
FIG. 4 is a conceptual diagram illustrating a first exemplary embodiment of aerial cells for UAM operations.

FIG. 4 is a conceptual diagram illustrating a first exemplary embodiment of aerial cells for UAM operations.

Referring to FIG. 4, aerial cells for UAM operations may be composed of cone-shaped cells facing the air. To this end, base stations connected to a ground station may radiate toward the air to form the cone-shaped cells. Here, a cell service area of each aerial cell may include the airspace. By arranging these aerial cells sequentially, a corridor for UAM operations may be formed. Meanwhile, a vertiport may be a dedicated airport for UAM aerial vehicles.

Figure 5:
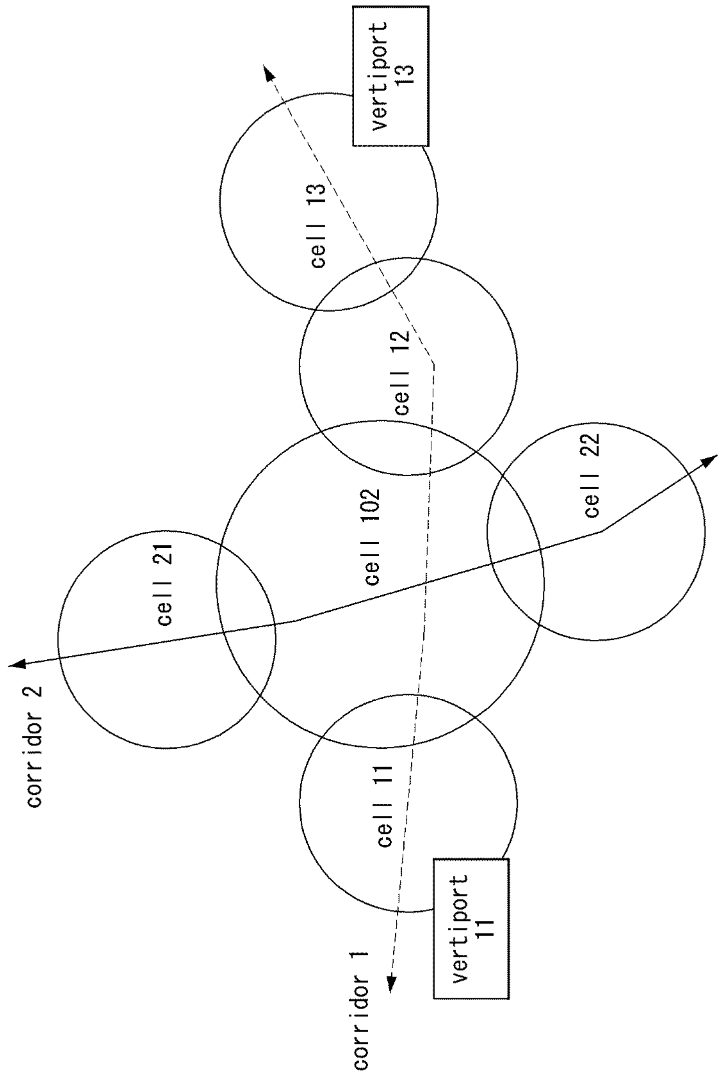
FIG. 5 is a conceptual diagram illustrating a first exemplary embodiment of a communication system for UAM including corridors and vertiports.

FIG. 5 is a conceptual diagram illustrating a first exemplary embodiment of a communication system for UAM including corridors and vertiports.

Referring to FIG. 5, in a communication system for UAM, a corridor 1 may be configured by sequentially arranging cells 11, 102, 12, and 13, and a corridor 2 may be configured by sequentially arranging cells 21, 102, and 22. Here, UAM aerial vehicles may include drones, flying cars, or the like. Meanwhile, a vertiport 1 may be placed at one end of the corridor 1, and the vertiport 2 may be placed at the other end of the corridor 1.

Meanwhile, the 3GPP's uncrewed aerial system (UAS) may be applied to implement the communication system for UAM. The 3GPP is pursuing the introduction of UAS based on the connectivity of cellular communications. The technical specification (TS) 22.125 of Release 17 of 3GPP discloses the UAS.

Figure 6:
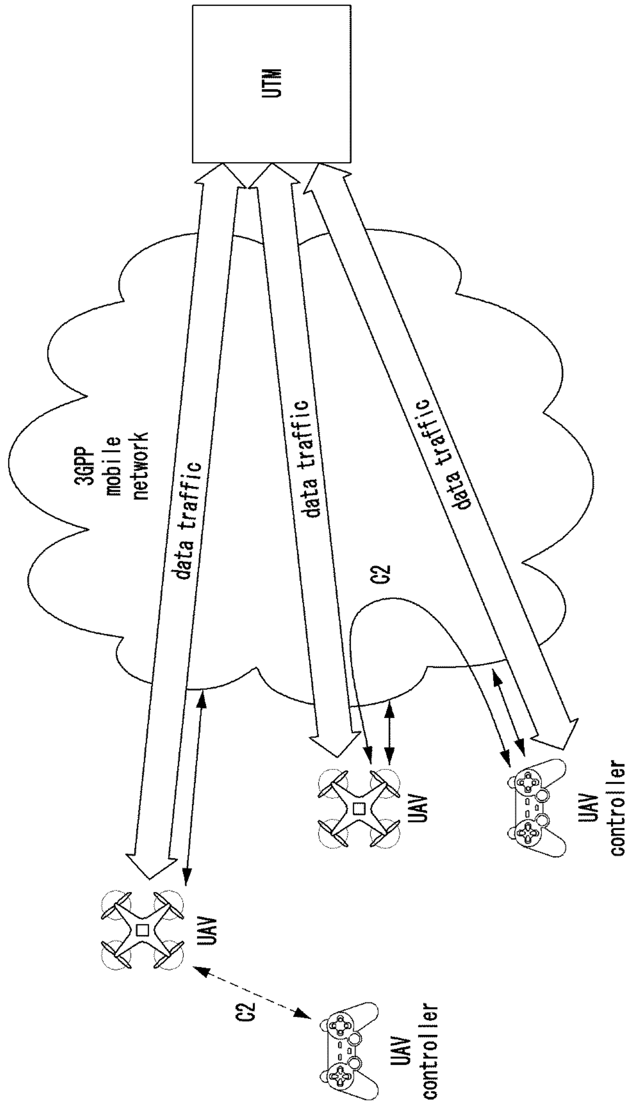
FIG. 6 is a conceptual diagram illustrating a first exemplary embodiment of UAS.

FIG. 6 is a conceptual diagram illustrating a first exemplary embodiment of UAS.

Referring to FIG. 6, the UAS may include an uncrewed aerial vehicle (UAV), a UAV controller, a UAS traffic management (UTM) device, and/or the like. Communication connection for UAV controls may use command and control (C2) communication schemes. Here, the C2 communication schemes may include a direct C2 communication scheme, a network-assisted C2 communication scheme, and a UTM-navigated C2 communication scheme.

The C2 communication schemes may be communication schemes in which the UTM controls operations of the UAV. In the UAS, the UAV may correspond to a UAM aerial vehicle, the UTM may correspond to a UAM control station, and a 3GPP mobile network may correspond to a UAM corridor. Therefore, the UAM corridor may require significant communication reliability. Meanwhile, when a UAM aerial vehicle travels along a corridor, the UAM aerial vehicle may perform a handover. For example, when a UAM aerial vehicle moves from the cell 11 to the cell 102, it may perform a handover from the cell 11 to the cell 102.

Figure 7:
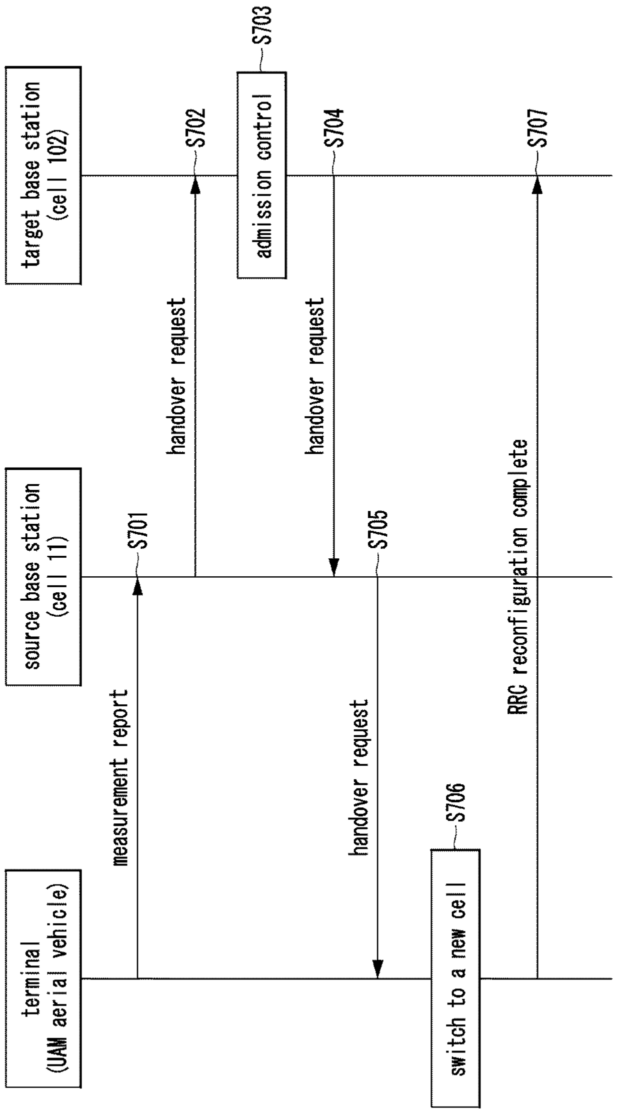
FIG. 7 is a conceptual diagram illustrating a first exemplary embodiment of a handover method for a UAM aerial vehicle.

FIG. 7 is a conceptual diagram illustrating a first exemplary embodiment of a handover method for a UAM aerial vehicle.

Referring to FIG. 7, a source base station (or, cell 11) may perform measurement configuration so that a terminal (or, UAM aerial vehicle) can perform measurements on neighboring base stations including a target base station (or, cell 102). Then, the terminal may measure signal strengths of the neighboring base stations and report a measurement result (measurement report) to the source base station (S701). Here, the reported measurement result may include a measurement result on cell levels of the neighboring base stations.

Based on the received measurement result, the source base station may determine a handover to the target base station, and may instruct the target base station to prepare for the handover by transmitting a handover request message to the target base station (S702). The target base station may decide whether to accept the handover of the terminal through admission control (S703). If the target base station decides to accept the handover of the terminal, the target base station may transmit a handover request acknowledgment message to the source base station (S704).

The source base station may transmit an RRC reconfiguration message including a handover command to the terminal (S705). The handover command may include information on a resource to be used by the terminal in a random access (RA) procedure for the target base station.

The terminal that receives the handover command may switch from the source base station to the target base station, which is a new cell, and perform the handover (S706). The terminal may release connection with the source base station, and attempt to access the target base station. The terminal may attempt random access based on information on the resource to be used in the random access procedure, which is provided by the target base station as being included in the handover command. When the terminal accesses the target base station through the random access procedure, the terminal may transmit an RRC reconfiguration complete message to the target base station (S707). Then, the target base station may receive the RRC reconfiguration complete message from the terminal.

Figure 8:
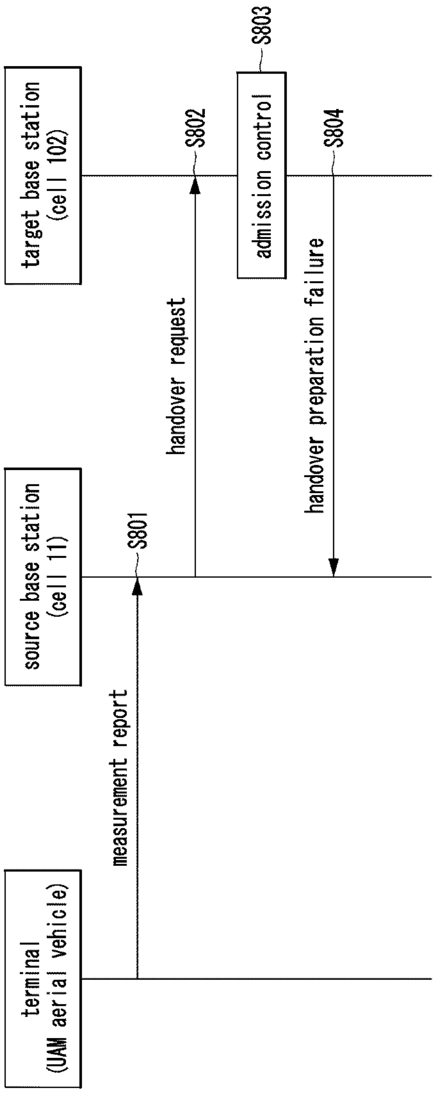
FIG. 8 is a conceptual diagram illustrating a second exemplary embodiment of a handover method for a UAM aerial vehicle.

FIG. 8 is a conceptual diagram illustrating a second exemplary embodiment of a handover method for a UAM aerial vehicle.

Referring to FIG. 8, a source base station (or, cell 11) may perform measurement configuration so that a terminal (or, UAM aerial vehicle) can perform measurements on neighboring base stations including a target base station (or, cell 102). Then, the terminal may measure signal strengths of the neighboring base stations and report a measurement result to the source base station (S801). Here, the reported measurement result may include a measurement result on cell levels of the neighboring base stations.

Based on the received measurement result, the source base station may determine a handover to the target base station, and may instruct the target base station to prepare for the handover by transmitting a handover request message to the target base station (S802). The target base station may decide whether to accept the handover of the terminal handover through admission control (S803). If the target base station decides not to accept the handover of the terminal, the target base station may transmit a handover preparation failure message to the source base station (S804). The source base station may receive the handover preparation failure message from the target base station.

In this case, the source base station may not provide information on the handover failure to the terminal (or, UAM aerial vehicle). Accordingly, if the terminal continues along its path, it may experience a radio link failure (RLF) and transition to an RRC idle (RRC_IDLE) state. The terminal may continue to request initial setup from the target base station. Alternatively, when the terminal encounters the cell 12, it may transition to an RRC active (RRC_ACTIVE) state through the initial setup. In the above-described situation, C2 communication between the UAM control station and the UAM aerial vehicle may be interrupted, thereby causing disruption in UAM operations.

Figure 9:
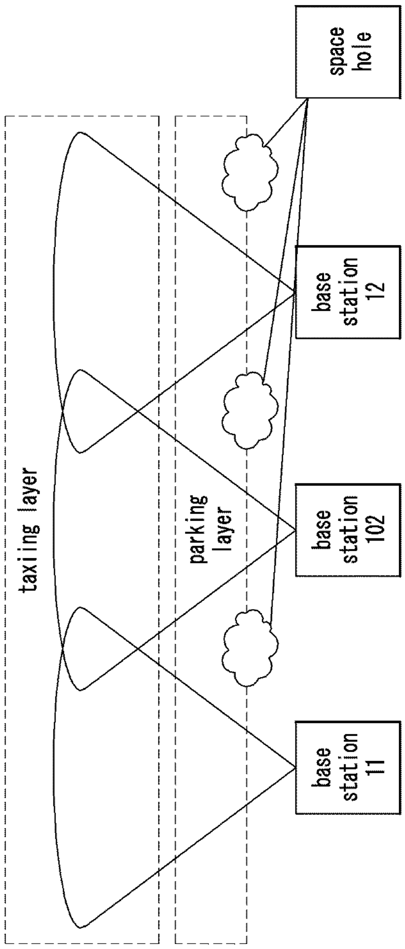
FIG. 9 is a conceptual diagram illustrating a second exemplary embodiment of aerial cells for UAM operations.

FIG. 9 is a conceptual diagram illustrating a second exemplary embodiment of aerial cells for UAM operations.

Referring to FIG. 9, aerial cells for UAM operations may be composed of cone-shaped cells facing the air. To this end, base stations 11, 102, and 12 connected to a ground station may radiate toward the air to form the cone-shaped cells. Here, a cell service area of each aerial cell may include the airspace. The aerial cells formed by the base stations 11, 102, and 12 may be sequentially arranged, and may form a corridor for UAM operations.

An empty space, called the space hole, may occur between cells due to the cone-shaped radiations. The UAM aerial vehicles may operate along the corridor in the airspace. In this case, the airspace may be composed of a taxiing layer and a parking layer. Here, an altitude of the taxiing layer may be higher than an altitude of the parking layer. The taxiing layer may not include the space hole, but the parking layer may include the space hole.

As described above, the UAM aerial vehicle may not be interrupted in communication with the base station due to the space hole in the taxiing layer. Accordingly, the UAM aerial vehicle may operate reliably in the taxiing layer. However, when the UAM aerial vehicle operates in the parking layer, communication with the base station may be interrupted due to the space hole. As a result, it may be difficult for the UAM aerial vehicle to operate reliably in the parking layer. Accordingly, the UAM aerial vehicle may mainly operate in the taxiing layer. In addition, the UAM aerial vehicle may stay for a while in the parking layer. In the present disclosure, the base station may provide control information to the UAM aerial vehicle when acceptance fails during the handover preparation process. As a result, the UAM aerial vehicle may receive the control information from the base station and control its operation reliably.

Figure 10:
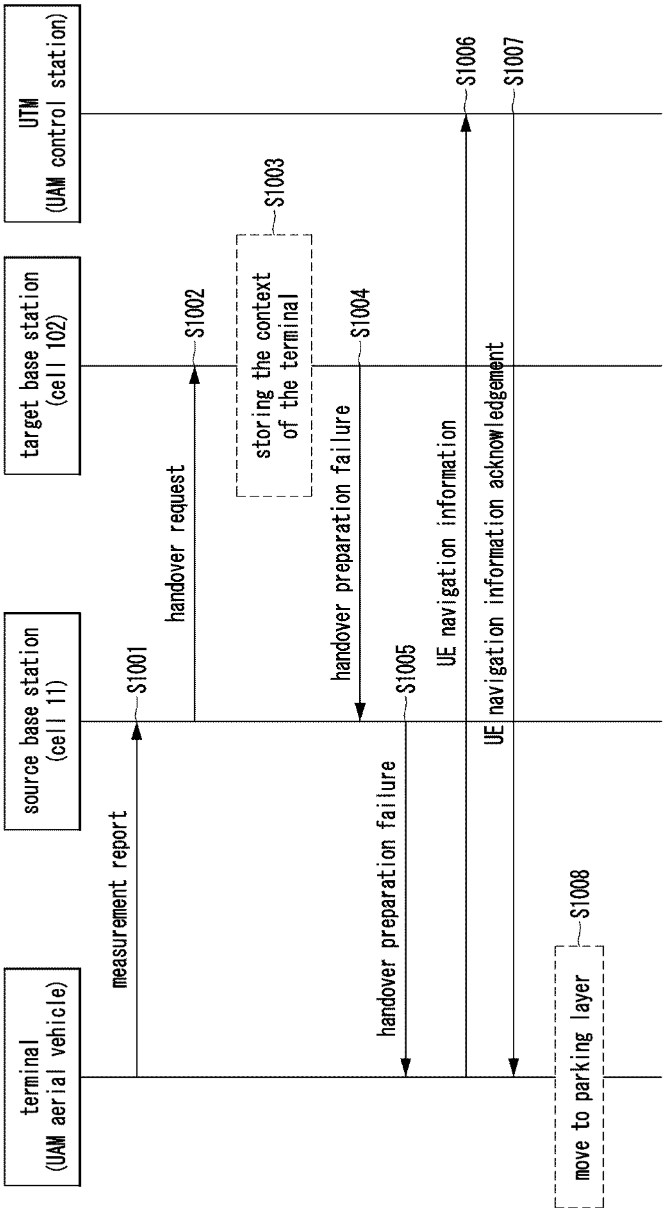
FIG. 10 is a sequence chart illustrating a first exemplary embodiment of a handover failure processing process in a handover method for UAM in a communication system.

FIG. 10 is a sequence chart illustrating a first exemplary embodiment of a handover failure processing process in a handover method for UAM in a communication system.

Referring to FIG. 10, a source base station (or, cell 11) may perform measurement configuration so that a terminal (or, UAM aerial vehicle) can perform measurements on neighboring base stations including a target base station (or, cell 102). Then, the terminal may measure signal strengths of the neighboring base stations and report a measurement result to the source base station (S1001). Here, the reported measurement result may include a measurement result on cell levels of the neighboring base stations.

Based on the received measurement result, the source base station may determine a handover to the target base station, and may instruct the target base station to prepare for the handover by transmitting a handover request message to the target base station (S1002). Here, the source base station may include context of the terminal (i.e., UE context) in the handover request message, and include an indication of managing and storing the context in the handover request message. The target base station may decide whether to accept the handover of the terminal through admission control (S1003). If the target base station decides to accept the handover of the terminal, the target base station may transmit a handover request acknowledgment message to the source base station.

On the other hand, the target base station may not accept the handover of the terminal through admission control. In this case, the target base station may transmit a handover preparation failure message including an appropriate cause for the handover preparation failure as a cause value to the source base station (S1004). In this case, the target base station may store the terminal context received in the handover request message according to the indication from the source base station.

Meanwhile, the source base station may receive the handover preparation failure message including the cause of the handover failure as the cause value from the target base station. The source base station that receives the handover preparation failure message may transmit a handover preparation failure message to the terminal (S1005). Then, the terminal may receive the handover preparation failure message from the source base station. Accordingly, the terminal may temporarily suspend the UAM operations.

In addition, the terminal may transmit a UAM navigation information message requesting coordinates of a location of the parking layer where it can briefly stay in a hovering state while suspending the operation (S1006). In this case, the terminal may transmit information on a current location thereof to the UAM control station. Here, the location information may include a physical cell identifier (PCI) of the source base station, altitude of the terminal, latitude of the terminal, longitude of the terminal, and/or the like. Then, the UAM control station may receive the UAM navigation information message from the terminal requesting the coordinates of the location of the parking layer where the terminal can stay in a hovering state for a while. In this case, the UAM control station may receive information on the current location of the terminal from the terminal.

Accordingly, the UAM control station may determine a location of the parking layer where the terminal can hover and stay for a while by referring to the current location of the terminal, and transmit a UAM navigation information acknowledgement message including information on coordinates of the determined location of the parking layer (S1007). Then, the terminal may receive the UAM navigation information acknowledgement message from the UAM control station, which includes the coordinates of the location of the parking layer where the terminal can stay for a while. Then, the terminal may move to the parking layer based on the received coordinates of the location of the parking layer where it can stay in the hovering state for a while, and stay in the parking layer for a while in the hovering state (S1008). In this case, the terminal may establish C2 communication with the UAM control station. Accordingly, the terminal may transmit data to the UAM control station, and the UAM control station may receive the data from the terminal. On the other hand, the UAM control station may transmit data to the terminal, and the terminal may receive the data from the UAM control station.

Figure 11:
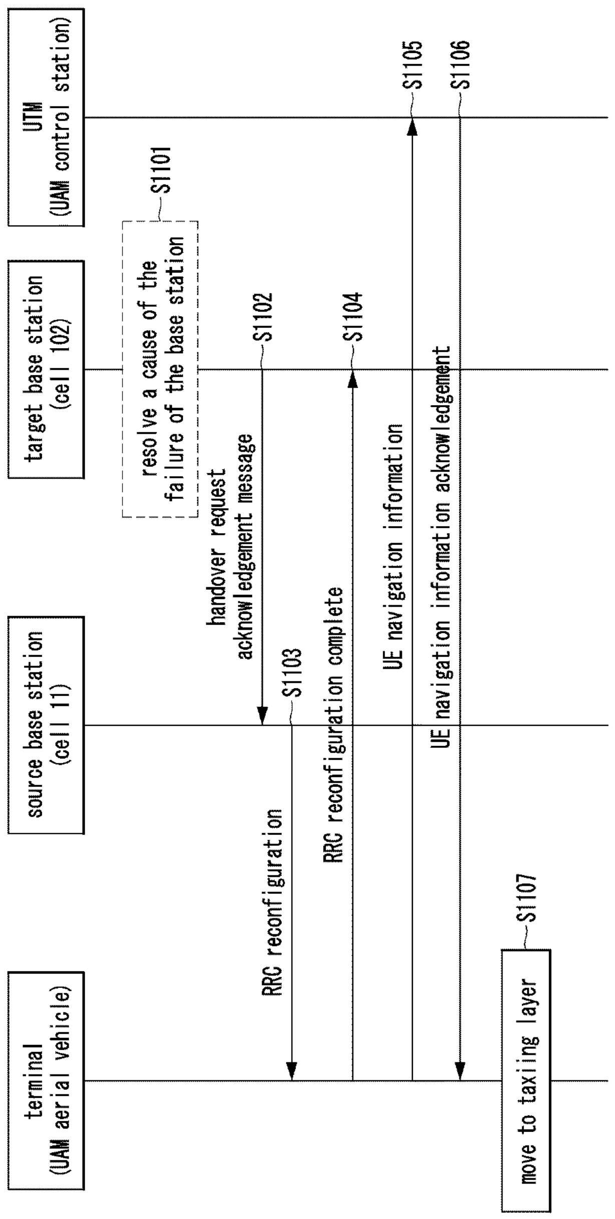
FIG. 11 is a sequence chart illustrating a first exemplary embodiment of a handover resumption process in a handover method for UAM in a communication system.

FIG. 11 is a sequence chart illustrating a first exemplary embodiment of a handover resumption process in a handover method for UAM in a communication system.

Referring to FIG. 11, a cause of a handover failure at the target base station may be resolved due to various situational changes (S1101). Then, the target base station may proceed with a handover resumption process. To this end, the target base station may transmit a handover request acknowledgement message to the source base station (S1102).

The source base station may transmit an RRC reconfiguration message including a handover command to the terminal (S1103). The handover command may include information on a resource to be used by the terminal in an RA procedure for the target base station.

The terminal that receives the handover command may perform a handover for switching from the source base station to the target base station that is a new cell. The terminal may release connection with the source base station, and attempt to connect to the target base station. The terminal may attempt random access based on information on the resource to be used in the random access procedure provided by the target base station included in the handover command. Then, when the terminal accesses the target base station through the random access procedure, the terminal transmit an RRC reconfiguration complete message to the target base station (S1104). Then, the target base station may receive the RRC reconfiguration complete message from the terminal.

Meanwhile, the terminal may transmit, to the UAM control station, a UAM navigation information message requesting coordinates of a location of the taxiing layer to move in order to depart from the parking layer where it is in the hovering state and move to the taxiing layer (S1105). Here, the terminal may transmit information on a current location of the terminal to the UAM control station, and the information of the current location may include a PCI of the source base station, altitude of the terminal, latitude of the terminal, longitude of the terminal, and/or the like. Then, the UAM control station may receive the UAM navigation information message from the terminal requesting the coordinates of the location in the taxiing layer in which navigation can be continued after leaving the parking layer where the vehicle is temporarily in the hovering state. In this case, the UAM control station may receive the information of the current location of the terminal.

Accordingly, the UAM control station may determine the location of the taxiing layer where the terminal can continue navigation after leaving the parking layer by referring to the information of the current location of the terminal, and transmit a UAM navigation information acknowledgement message including coordinates of the determined location of the taxiing layer to the terminal (S1106). Then, the terminal may receive, from the UAM control station, the UAM navigation information acknowledgement message including the coordinates of the location of the taxiing layer where operations can be resumed. Then, the terminal may move to the taxiing layer and resume operations based on the received coordinates of the location of the taxiing layer (S1107). In the above-described manner, the UAM aerial vehicle may continue the UAM handover while maintaining the C2 communication with the UAM control station.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of an aerial vehicle for urban air mobility (UAM), comprising:

reporting, to a first base station, a measurement result for neighboring base stations including a second base station;

receiving, from the first base station, an indication of a failure of a handover to the second base station, wherein the failure of the handover comprises a handover preparation failure at the second base station determined based on admission control processing performed by the second base station in response to the measurement result;

in response to receiving the indication of the handover preparation failure, requesting, to a control station, first location information indicating a first location to move to in response to the failure of the handover;

receiving the first location information from the control station; and moving to the first location according to the received first location information to maintain communication with the control station during the handover failure, wherein the first location is a location included in a parking layer in an airspace.

2. The method according to claim 1, wherein the reporting of the measurement result for neighboring base stations comprises:

receiving, from the first base station, a measurement configuration for the neighboring base stations including the second base station;

performing measurements on signal strengths of the neighboring base stations based on the measurement configuration; and reporting the measurement result obtained by performing the measurements to the first base station.

3. The method according to claim 1, further comprising:

establishing command and control (C2) communication with the control station;

transmitting first data to the control station through the C2 communication; and receiving second data from the control station through the C2 communication.

4. The method according to claim 3, wherein the C2 communication is performed using one of a direct C2 communication scheme, a network-assisted C2 communication scheme, or an uncrewed aerial system traffic management (UTM)-navigated C2 communication scheme.

5. The method according to claim 1, wherein the first base station and the second base station constitute a UAM corridor, and the aerial vehicle moves through the airspace along the UAM corridor.

6. The method according to claim 5, wherein the airspace is composed of a taxiing layer at a first altitude section and the parking layer at a second altitude section including a space hole, wherein an altitude of the first altitude section is higher than an altitude of the second altitude section.

7. The method according to claim 1, further comprising:

receiving, from the first base station, a handover command in response to resolving a cause of the handover preparation failure in at the second base station;

performing a handover to the second base station according to the handover command; and transmitting a message indicating radio resource control (RRC) configuration completion to the second base station.

8. The method according to claim 7, further comprising:

requesting, to the control station, second location information indicating a second location to resume movement according to the handover command;

receiving, from the control station, the second location information indicating the second location to resume movement; and moving according to the received second location information.

9. A method of a first base station for urban air mobility (UAM), comprising:

receiving, from an aerial vehicle, a measurement result for neighboring base stations including a second base station;

determining, based on the measurement result, to initiate a handover of the aerial vehicle to the second base station;

transmitting a handover request to the second base station;

receiving an indication of a failure of the handover from the second base station, wherein the failure of the handover comprises a handover preparation failure determined by the second base station based on admission control processing performed at the second base station; and transmitting an indication of the handover preparation failure to the aerial vehicle, such that the aerial vehicle is informed that the handover to the second base station has failed prior to completion of the handover, wherein the first base station and the second base station constitute a UAM corridor, and the aerial vehicle moves through an airspace along the UAM corridor.

10. The method according to claim 9, wherein the receiving of the measurement result for neighboring base stations comprises:

transmitting, to the aerial vehicle, a measurement configuration for the neighboring base stations including the second base station; and receiving, from the second base station, the measurement result of measurements performed on the neighboring base stations.

11. The method according to claim 9, wherein the handover request includes context of the aerial vehicle and an indication of storing the context of the aerial vehicle.

12. The method according to claim 11, wherein the airspace is composed of a taxiing layer at a first altitude section and a parking layer at a second altitude section including a space hole, wherein an altitude of the first altitude section is higher than an altitude of the second altitude section, and a first location is a location included in the parking layer to which the aerial vehicle moves in response to the handover preparation failure.

13. The method according to claim 9, further comprising:

receiving, from the second base station, a handover command in response to resolving a cause of the handover preparation failure in at the second base station; and transmitting the handover command to the aerial vehicle.

14. An aerial vehicle for urban air mobility, comprising a processor, wherein the processor causes the aerial vehicle to perform:

reporting, to a first base station, a measurement result for neighboring base stations including a second base station;

receiving, from the first base station, an indication of a failure of a handover to the second base station, wherein the failure of the handover comprises a handover preparation failure at the second base station determined based on admission control processing performed by the second base station in response to the measurement result;

in response to receiving the indication of the handover preparation failure, requesting, to a control station, first location information indicating a location to move to in response to the failure of the handover;

receiving the first location information from the control station; and moving to the first location according to the received first location information to maintain communication with the control station during the handover failure, wherein the first location is a location included in a parking layer in an airspace.

15. The aerial vehicle according to claim 14, wherein in the reporting of the measurement result for neighboring base stations, the processor further causes the aerial vehicle to perform:

receiving, from the first base station, a measurement configuration for the neighboring base stations including the second base station;

performing measurements on signal strengths of the neighboring base stations based on the measurement configuration; and reporting the measurement result obtained by performing the measurements to the first base station.

16. The aerial vehicle according to claim 14, wherein the processor further causes the aerial vehicle to perform:

establishing command and control (C2) communication with the control station;

transmitting first data to the control station through the C2 communication; and receiving second data from the control station through the C2 communication.

17. The aerial vehicle according to claim 14, wherein the processor further causes the aerial vehicle to perform:

receiving, from the first base station, a handover command in response to resolving a cause of the handover preparation failure in at the second base station;

performing a handover to the second base station according to the handover command; and transmitting a message indicating radio resource control (RRC) configuration completion to the second base station.

18. The aerial vehicle according to claim 17, wherein the processor further causes the aerial vehicle to perform:

requesting, to the control station, second location information indicating a second location to resume movement according to the handover command;

receiving, from the control station, the second location information indicating the second location to resume movement; and moving according to the received second location information.

* * * * *